UNITED STATES PATENT OFFICE.

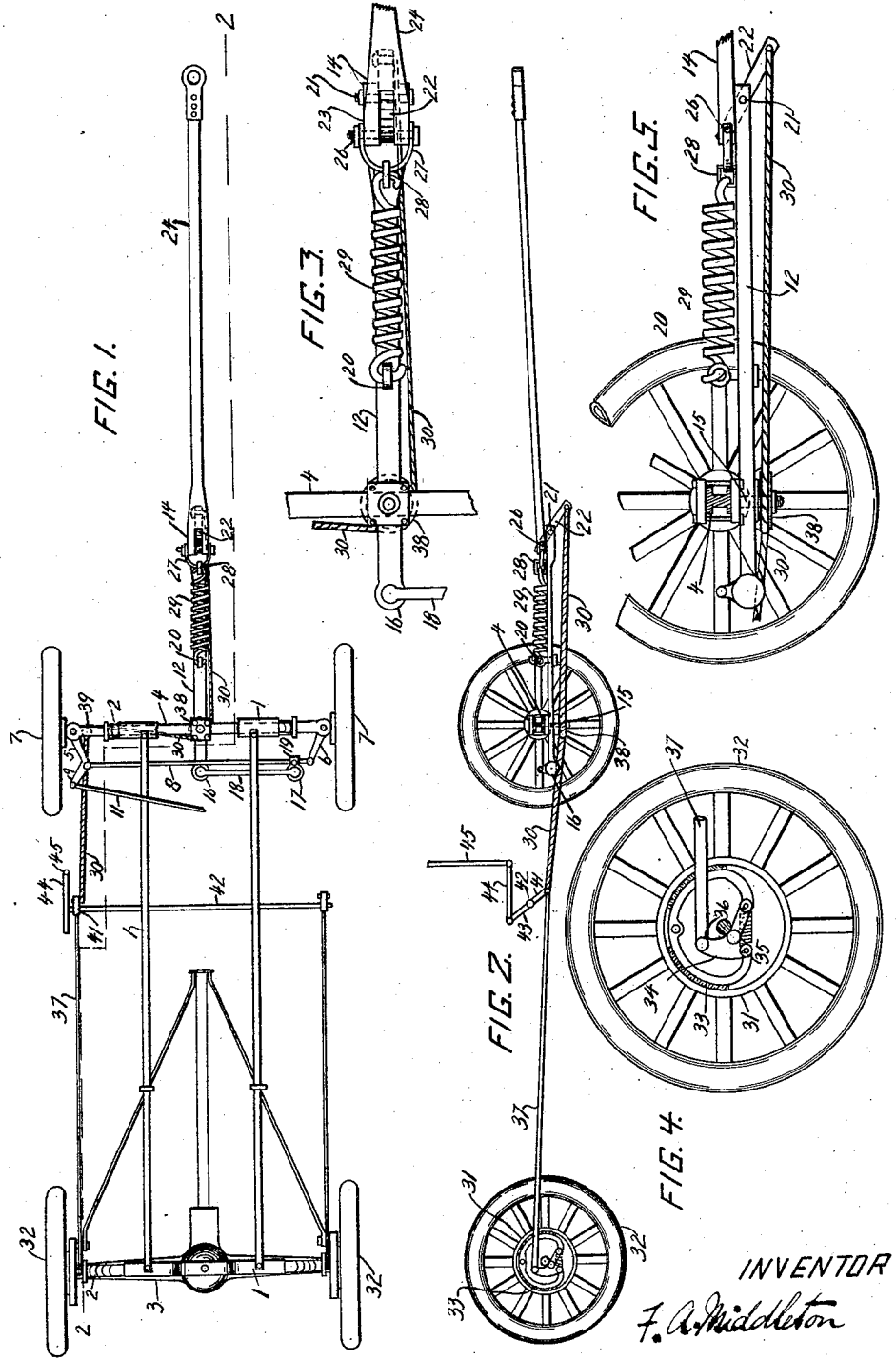

FERRIS A. MIDDLETON, OF SAN FRANCISCO, CALIFORNIA.

AUTOMATIC DRIVER.

1,417,624. Specification of Letters Patent. Patented May 30, 1922.

Application filed October 27, 1919. Serial No. 333,677.

*To all whom it may concern:*

Be it known that I, FERRIS A. MIDDLETON, a citizen of the United States, residing at San Francisco, in the county of San Francisco and State of California, have invented a new and useful Automatic Driver, of which the following is a specification.

The object of the present invention is to provide a device by means of which an automobile or other four wheel motor driven vehicle may be towed by another vehicle or by horses or any other power applied to the device in such a way that the steering of the towed vehicle is done automatically by the said device and that at the same time the brake of the towed vehicle is worked automatically by the said device, so that the brake is automatically set whenever the power applied to the device is stopped, and the brake is automatically released whenever the power is applied to the said device.

I attain these objects by the mechanism illustrated in the accompanying drawing, in which Fig. 1 is a plan view of the chassis of an automobile, with parts not essential to the invention left out and with my device attached to it; Fig. 2 is a section along line 2—2 of Fig. 1; Figure 3 is a detail plan view of the brake operating and steering mechanism; Figures 4 and 5 are enlarged detail views of parts shown in Figure 2.

Similar numerals refer to similar parts throughout the several views.

The frame 1 of the automobile rests on the springs 2 secured to the rear axle housing 3 and the front axle 4. Pivotally connected to the front axle, on either end, are the steering arms 5 and 6, one end of each of which serves as a spindle for the wheels 7 and the other ends of which are connected to each other by the link bar 8. An extension 9 of the steering arm 5 is pivotally connected with steering rod 11, only partly shown on the drawing, which said steering rod is connected to the steering wheel in the usual manner.

Detachably fastened underneath the front axle 4, preferably in the center, but if this is not feasible, at any place, is part 12 of pole 14, in a longitudinal, horizontal direction, pivoted, as shown at 15, so as to allow it to swing sideways. This part 12 extends to the rear of the pivotal point 15 a sufficient distance that it may be conveniently connected to the link bar 8. In some motor vehicles this link bar is in front of the front axle. In that case no extension would be necessary and part 12 of pole 14 would be fastened to the link bar in front of the axle. The connection is here shown as accomplished by two joints, 16 and 17, preferably ball joints, joint 16 connecting the end of part 12 of pole 14 to arm 18, and joint 17 connecting arm 18 to arm 19, which latter arm 19 is rigidly secured to link bar 8. The connection may be made in any other suitable manner.

The front end of part 12 of pole 14 runs out into a fork, on the inside of which swings vertically, around bolt 21 penetrating said fork in a horizontal direction, a lever 22. The upper part of said lever 22 is pivotally engaged by the forked end 23 of part 24 of pole 14 by means of bolt 26. This bolt 26 also serves as a hold for a clamp 27, extending rearwardly, which engages, by means of ring 28 or otherwise, a strong spring 29, running parallel to and on top of part 12 of pole 14; the other end of this spring is engaged by an eyebolt 20 securely fastened to said part 12 at a place a convenient distance to the rear of ring 28; several holes for eyebolts may be provided, so as to enable the operator to regulate the tension of the spring according to the weight of the car. Part 24 of pole 14 has at the front end securely fastened to it an eye or a hook or any other convenient means of attaching it to the pulling power.

The lower part of lever 22 is connected by any suitable means, preferably, as here shown, by a cable wire 30, to the emergency brake attached to the rear wheels. Although this may be done in any suitable manner and the most suitable manner will vary according to the different makes of different motor vehicles, the connection is here shown as follows: The brake chosen for this description is an expanding band brake. The drum 31, rigidly fastened to the hub of the rear-wheel 32 and arranged with an internal bearing surface, contains the expanding band 33. The lever arm 34, double pivoted at 35 and 36, is engaged by the link 37. The other end of link 37 is here shown as connected with the lower end of arm 41, the other end of which is rigidly fastened to shaft 42. Rigidly fastened to this transverse shaft 42, but going in opposite direction to arm 41, is arm 43, pivotally connected at its free end with rod 44, which latter rod again is at its other end pivotally connected with brake lever 45, shown only partly on this drawing. The link 37 is also at some convenient point, on the drawing at the point where it joins arm 41, connected with the wire cable 30, either directly, or after the wire cable has been led over one or more pulleys, which may be necessitated by various parts of the automobile being in the way of a direct connection. On the drawing the wire cable is shown as going over two pulleys 38 and 39, both of which are fastened to the front axle.

The device is to be operated as follows:

Before it is fastened to the vehicle to be towed, for instance the automobile, the brake is set, by means of brake lever 45. Then the device is attached with the wire cable 30 held tightly between the lever 22 and arm 41 of transverse shaft 42. The brake lever 45 may then be released, since now the strong spring 29, working through the lever 22, will hold the brake set. Then the power is to be applied. Any power applied at the pole 24 will have two results: First it will loosen the spring 29, thereby allowing the lower end of lever 22 to swing backward and to release the brake and secondly it will pull the automobile forward. When the power applied at the pole 24 is stopped, this again will have two results: First it will stop the automobile and secondly the spring 29 will return to its original position, thereby swinging forward the lower end of lever 22 and as a consequence setting the brake. This latter function is of particular importance, where the automobile is headed in an uphill direction, but is also important on level roads, since it prevents the second machine from colliding with the first machine furnishing the power.

I claim:

1. In combination with a motor driven vehicle, a longitudinal pole swingable on a detachable pivot extending from the front axle in vertical direction, the rear end of said pole engaging the steering apparatus of said vehicle, the front end adapted to be connected with some power, the pole being divided into a forward and a rearward part, a lever fulcrumed at the front end of the rearward part, one arm of said lever pivotally engaging the back end of the forward part of the pole and a spring extending backwardly from said forward part and rigidly connected to the rearward part of the pole, the other arm of the lever engaging a wire cable, the latter controlling the brake.

2. In combination with a motor driven vehicle, a detachable longitudinal pole divided into a forward and a rearward part, a lever fulcrumed at the front end of the rearward part, one arm of said lever pivotally engaging the back end of the forward part of the pole and a spring extending backwardly from said forward part and rigidly connected to the rearward part of the pole, the other end of the lever engaging a wire cable, the latter controlling the brake.

FERRIS A. MIDDLETON.